(12) United States Patent
Hennig et al.

(10) Patent No.: US 9,871,666 B2
(45) Date of Patent: Jan. 16, 2018

(54) INTERMEDIATE UNICAST NETWORK AND METHOD FOR MULTICAST DATA NETWORKS

(71) Applicant: AvaLAN Wireless Systems, Inc., Madison, AL (US)

(72) Inventors: Jason Hennig, Regina (CA); Michael R. Derby, Madison, AL (US); Brook R. Svoboda, San Diego, CA (US)

(73) Assignee: AvaLAN Wireless Systems, Inc., Madison, AL (US)

( * ) Notice: Subject to any disclaimer, the term of this patent is extended or adjusted under 35 U.S.C. 154(b) by 73 days.

(21) Appl. No.: 14/750,851

(22) Filed: Jun. 25, 2015

(65) Prior Publication Data

US 2016/0380890 A1    Dec. 29, 2016

(51) Int. Cl.
*H04L 12/50* (2006.01)
*H04L 12/18* (2006.01)
*H04L 29/06* (2006.01)

(52) U.S. Cl.
CPC .............. *H04L 12/18* (2013.01); *H04L 69/08* (2013.01)

(58) Field of Classification Search
CPC ....................................................... H04L 12/18
USPC ......................................................... 370/390
See application file for complete search history.

(56) References Cited

U.S. PATENT DOCUMENTS

| 6,578,084 | B1 | 6/2003 | Moberg et al. | |
| 6,697,872 | B1 | 2/2004 | Moberg et al. | |
| 6,701,370 | B1 | 3/2004 | Dillon | |
| 6,748,447 | B1* | 6/2004 | Basani | H04L 67/1095 709/219 |
| 6,862,622 | B2 | 3/2005 | Jorgensen | |
| 7,020,166 | B2 | 3/2006 | Chien | |
| 7,126,952 | B2 | 10/2006 | Hooper et al. | |
| 7,568,093 | B2 | 7/2009 | Broberg et al. | |
| 7,706,367 | B2 | 4/2010 | Das et al. | |
| 7,802,000 | B1* | 9/2010 | Huang | G06F 9/5077 455/404.2 |
| 8,942,236 | B1 | 1/2015 | Vincent et al. | |
| 2004/0215799 | A1* | 10/2004 | Lehmann, Jr. | H04L 12/1827 709/230 |
| 2006/0072618 | A1 | 4/2006 | Moribe et al. | |
| 2013/0219171 | A1 | 8/2013 | Gearhart et al. | |

(Continued)

OTHER PUBLICATIONS

Configuring IP Multicast Routing, Cisco IOS IP Configuration Guide, pp. 399-458.

(Continued)

*Primary Examiner* — Dang Ton
(74) *Attorney, Agent, or Firm* — Lanier Ford Shaver & Payne PC

(57) ABSTRACT

An intermediate unicast network is provided for use in a multicast data network where the multicast network is a local server and a plurality of network hosts, which may be, for example, point-of-sale registers. The intermediate network includes a network device for receiving multicast data from the local server, encapsulating such data in a unicast data transfer frame, and transferring the unicast data to a plurality of dongles, each of which being associated with a corresponding network host. Each dongle is configured to decapsulate the unicast data received from the network appliance and to re-assemble the data into multicast data for transfer to the associated network host.

9 Claims, 7 Drawing Sheets

(56) References Cited

U.S. PATENT DOCUMENTS

2016/0044078 A1* 2/2016 Hosur ............... H04L 67/02
709/219
2016/0337428 A1* 11/2016 May, Jr. ............ H04L 65/4092

OTHER PUBLICATIONS

Wikibooks, Communication Networks/TCP and UDP Protocols, http://en.wikibooks.org/wiki/Communication_Networks/TCP_and_UDP_Protocols.
Wikipedia, Encapsulation (networking), http://en.wikipedia.org/wiki/Encapsulation_%28networking%29.
Wikipedia, Ethernet, http://en.wikipedia.org/Ethernet#Layer_2_.E2.80.93_datagrams.
Wikipedia, Internet protocol suite, http://en.wikipedia.org/Internet_protocol_suite.
Wikipedia, Internet protocol suite, http://en.wikipedia.org/wiki/Internet_protocol_suite#Key_architectural_principles.
Wikipedia, IP fragmentation attack, http://en.wikipedia.org/wiki/IP_fragmentation_attack.
Walton, Sean, Datagram/Multicasting (Part 1), 2003.
Wikipedia, Network switch, http://en.wikipedia.org/wiki/Network_switch.
Wikipedia, OSI model, http://en.wikipedia.org/wiki/OSI_model, Jun. 8, 2015.
Wikipedia, Reliable multicast, http://en.wikipedia.org/wiki/Reliable_multicast, May 15, 2015.
Wikipedia, Transmission Control Protocol, http://en.wikipedia.org/wiki/Transmission_Control_Protocol#TCP_segment_structure, Jun. 8, 2015.
Slocum, James, Blog: The Inner Thoughts of a C Developer, UDP Socket Programming with Dart (Unicast and Multicast), Feb. 25, 2014.
Wikipedia, User Datagram Protocol, http://en.wikipedia.org/wiki/User_Datagram_Protocol, Jun. 8, 2015.

* cited by examiner

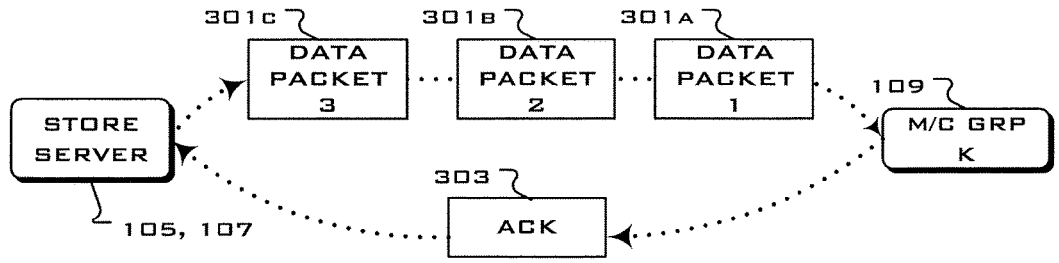
FIG. 3A
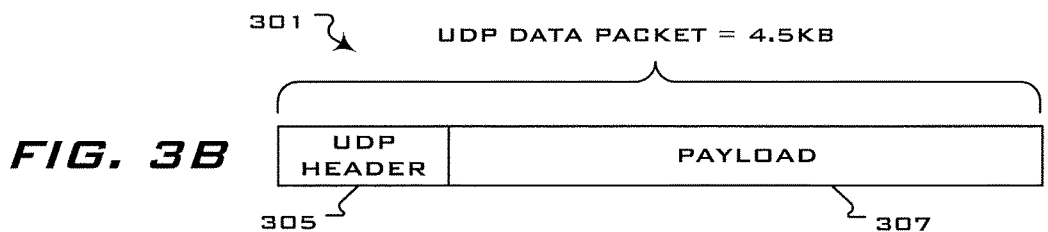
FIG. 3B
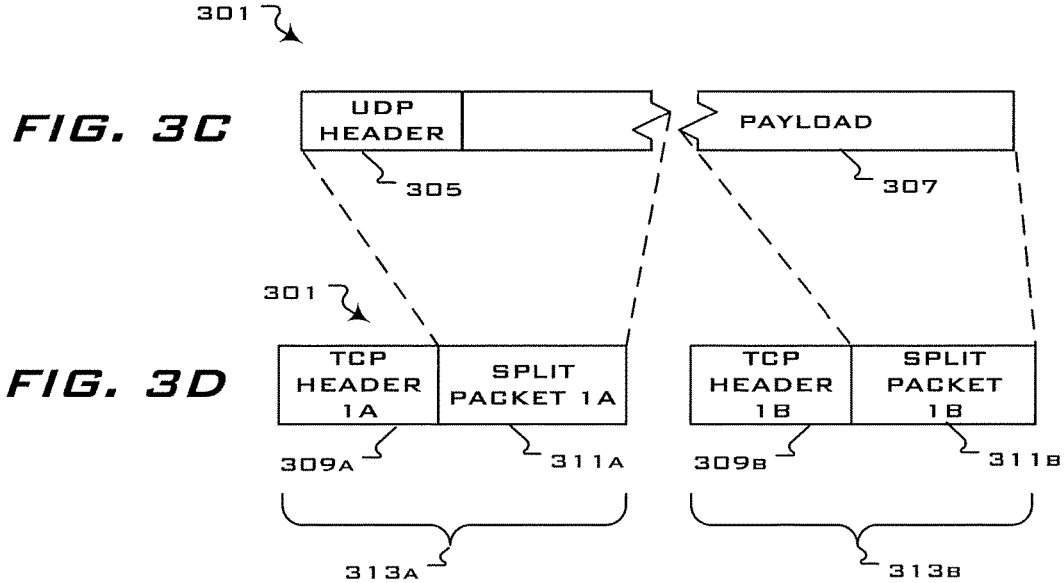
FIG. 3C
FIG. 3D

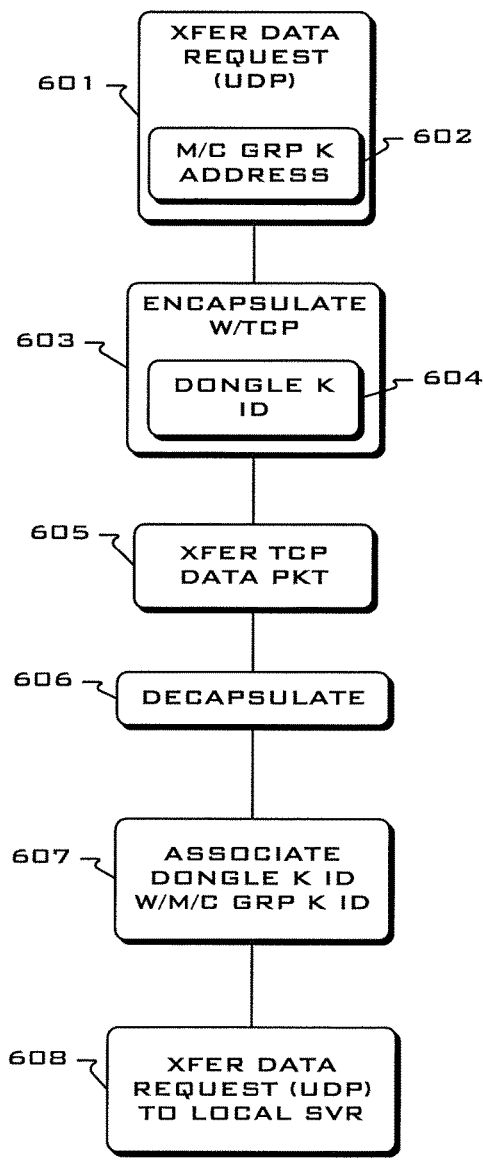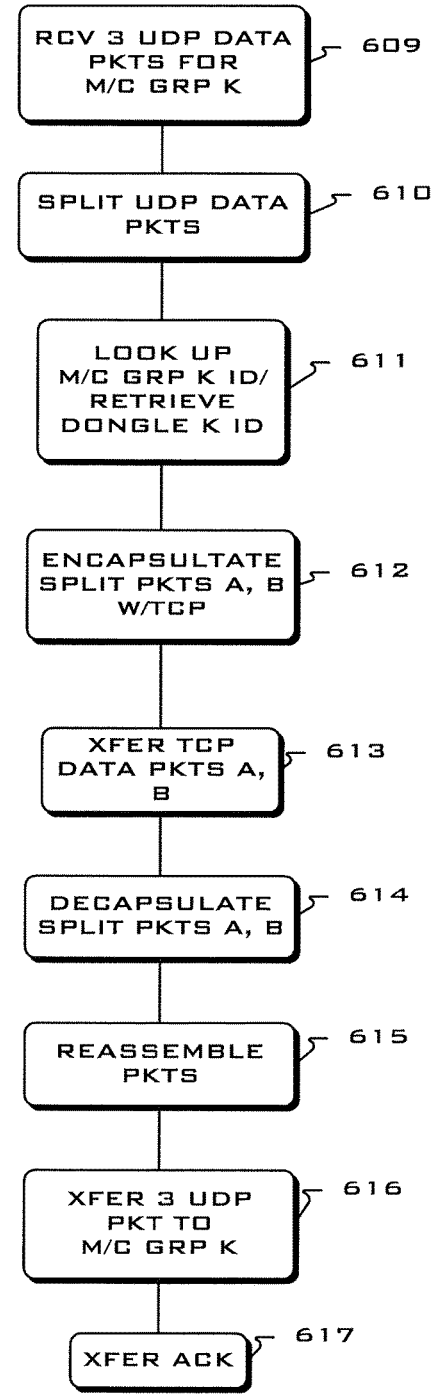
FIG. 6A
FIG. 6B

INTERMEDIATE UNICAST NETWORK AND METHOD FOR MULTICAST DATA NETWORKS

BACKGROUND

Field

The present disclosure relates generally to data networks, and more particularly to multicast data networks, and still more particularly to an intermediate unicast network for such multicast data networks.

Description of the Problem and Related Art

Many large retail company's "point-of-sale" [PoS] backbone is based on the vintage Toshiba ACE system using IBM 4960 servers. When this technology was released in the 1980's there was no way to predict how complex Ethernet networking architectures would operate in 2015. At the core of large retailer's internal network are often over 50,000 PoS units that require modernization of how they send, receive and interact with the rest of the corporate network.

The challenge is that these PoS devices transmit and receive using an antiquated method of "multicast," data packets, typically using the long-used user datagram protocol (UDP) in the transport layer.

FIG. 1 illustrates a typical prior art network architecture 100 for such systems where a centralized computer-based server 101 disseminates data over an internetwork (internet) virtual private network (VPN) 103 to a plurality of remote, distributed local servers 105a-d located at retail outlets and which in turn convey the data to a plurality of distributed devices 109 a-e, which may be PoS registers. Generally, the data comprises inventory data representing inventory, for example, stock keeping unit (SKU) data, and pricing data for each SKU, including not only normal retail price but also any price discounts. In some instances, the central server 101 must provide data to over 50,000 registers 109, and this is executed each day because of constantly changing pricing and inventory within each retail outlet. The amount of data transmitted can be enormous.

Between the local servers 105a-d and the registers 109, the system 100 uses a multicast communication method, but one wherein all network hosts 109 hear all the data for all the hosts regardless of relevance to an individual host. To transmit data, the system 100 employs Multicast UDP packets as the data transport mechanism. Normally, multicast techniques are termed "one-to-many," where, for example, a local server communicates with specific groups of hosts each of which share a specific multicast group identifier. Each host on the network receive all the data for all hosts but only allows data with the correct group identifier to enter into the host's operating system. All members of the multicast group on this network 100 are expected by the server to receive the group's data regarding pricing and inventory. Although, each register 109 is singular, it is designated as a member of a multicast group. Unfortunately, the network can become saturated with huge amounts of unneeded data transfers due to multicast protocol's inherently wasteful technique of sending all the data for all the groups to all the registers on the network.

Multicast packet transfers data use UPD/IP protocol. UDP protocol uses a simple connectionless transmission model with a minimum of protocol mechanism and has no handshaking or packet acknowledgment dialogues. An illustration of a UDP data packet 301 is shown in FIG. 3B and comprises a UDP/IP header 305 and a payload 307 (data). Multicast UDP/IP is inherently unreliable because there is no acknowledgment of delivery, packet retransmission, packet ordering, or duplicate packet protection. Because of these shortcomings any multicast group member may fail to receive all of the group's inventory and pricing data, which causes the data transfer for the entire multicast group K to be terminated and then restarted again at the beginning to insure all multicast groups 109a-e receive the full data transfer. It is common that several restarts may be required for all group members to receive the entire transfer. This can result in unnecessary boot up delays and in larger networks, may result in data overflows within the local network, resulting in more lost packets which results in more transfer restarts which results in more saturation.

This is an unscalable, inefficient and unreliable method for communication on a modern network. The currently deployed infrastructure of these PoS devices is massive with some PoS systems as old as 20 years. New PoS systems still use this method today and there is no foreseeable end-of-life to this antiquated PoS communications "standard".

SUMMARY

For purposes of summary, certain aspects, advantages, and novel features are described herein. It is to be understood that not necessarily all such advantages may be achieved in accordance with any one particular embodiment. Thus, the apparatuses or methods claimed may be embodied or carried out in a manner that achieves or optimizes one advantage or group of advantages as taught herein without necessarily achieving other advantages as may be taught or suggested herein.

Disclosed hereinbelow is an intermediate unicast network interposed within a local area network that is configured to transfer data according to a multicast protocol between a local server and a plurality of local multicast groups. The intermediate network comprises a plurality of computer-based dongle devices, each of which is in communication with a corresponding multicast group according to said multicast protocol, and a computer-based network appliance in communication with each of the dongle devices according to a unicast protocol and in communication with the local server according to said multicast protocol.

An exemplary method that may be performed by such a network includes the steps of converting multicast data received from a local server according to a multicast protocol into unicast data, transferring the converted data according to a unicast protocol, converting the transferred data back into multicast data, and then transferring the multicast data to a network host according to said multicast protocol.

BRIEF DESCRIPTION OF THE DRAWINGS

The system and method set forth herein is described with reference to the accompanying drawings. In the drawings, like reference numbers indicate identical or functionally similar elements. Additionally, the left-most digit(s) of a reference number identifies the drawing in which the reference number first appears.

FIG. 3A illustrates the data transfer scheme according to a multicast data transfer protocol for the network shown in FIG. 1;

FIG. 3B depicts a typical UDP data packet used for data transfer according to a multicast protocol;

FIG. 3C shows fragmentation of the data packet of FIG. 3B according to an exemplary method performed by the intermediate network of FIG. 2;

FIG. 3D illustrates encapsulation of the fragmented data packets of FIG. 3C;

FIG. 6A is a flow diagram showing one exemplary process performed by the intermediate network of FIG. 2;

FIG. 6B is a flow diagram showing a second exemplary process performed by the intermediate network of FIG. 2.

DETAILED DESCRIPTION

The various embodiments of the packet encapsulation system and method for multicast data networks and their advantages are best understood by referring to the accompanying drawings. Throughout the drawings, like numerals are used for like and corresponding elements of the embodiments depicted in the various drawings.

Furthermore, reference in the specification to "an embodiment," "one embodiment," "various embodiments," or any variant thereof means that a particular feature or aspect described in conjunction with the particular embodiment is included in at least one embodiment. Thus, the appearance of the phrases "in one embodiment," "in another embodiment," or variations thereof in various places throughout the specification are not necessarily all referring to its respective embodiment.

Figure 1:
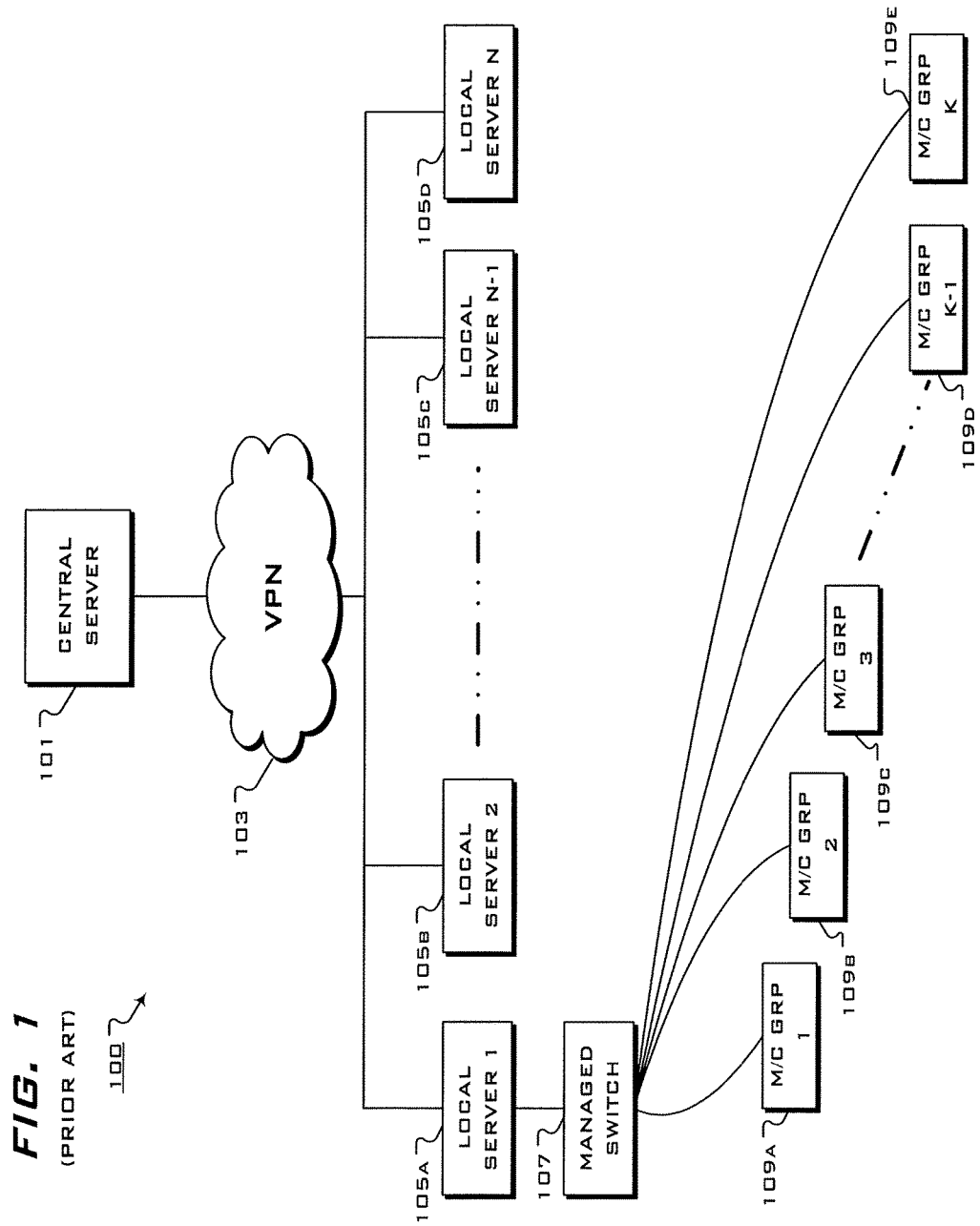
FIG. 1 is a functional schematic of a prior art multicast network.
Figure 2:
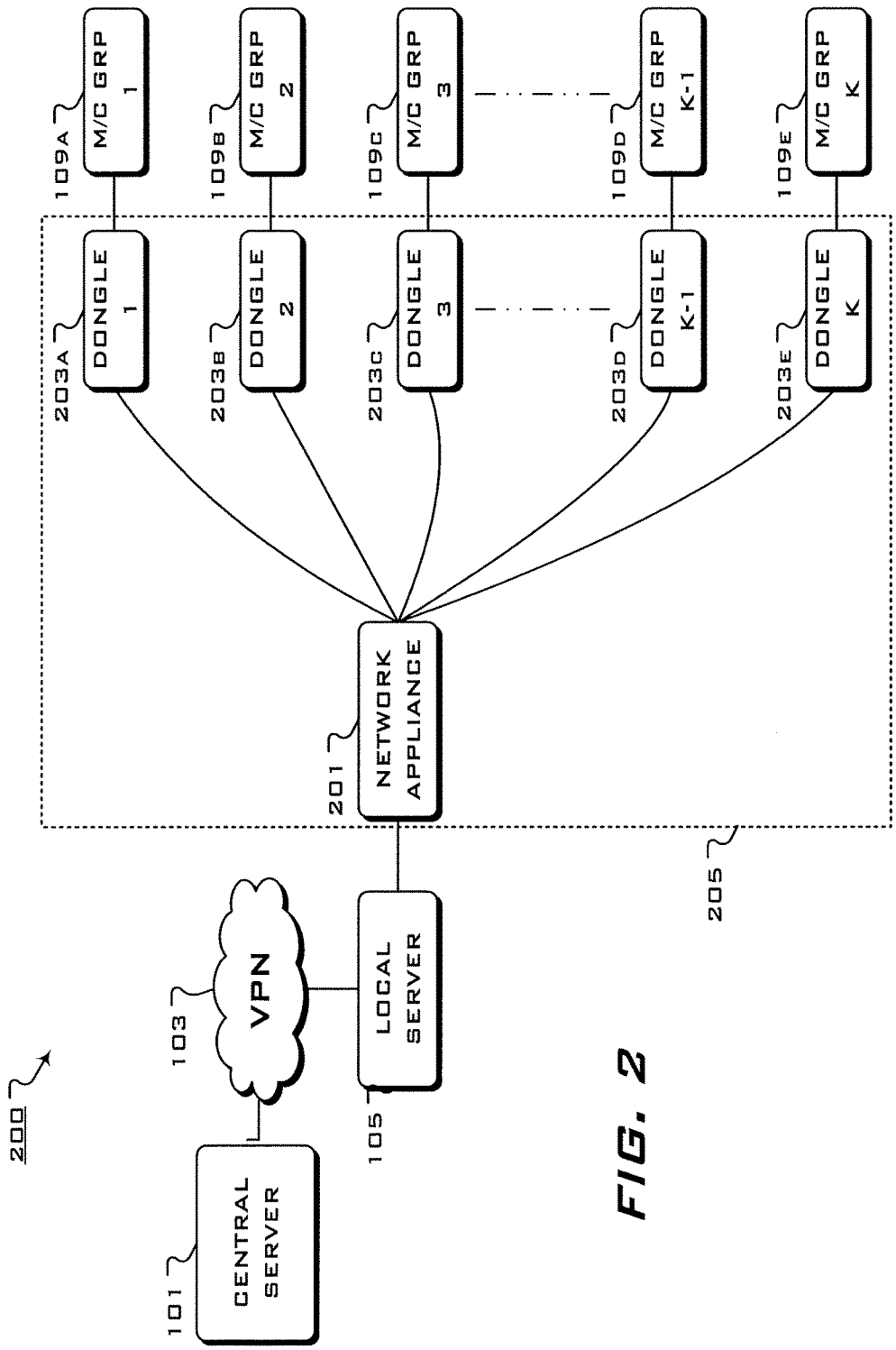
FIG. 2 is a functional schematic of a multicast network with an exemplary intermediate unicast network.

Referring to FIG. 2, a first exemplary embodiment illustrated where a system 200 includes a central server 101 in communication with a plurality of remote, distributed local servers 105 through an internet network 103, which, for example, may be a VPN. As in the prior art architecture 100 shown in FIG. 1, the local server 105 is in communication with a plurality of distributed multicast groups 109a-e, also employing UDP for data transport according to the method described above with reference to FIGS. 3A & 3B. In one embodiment, local servers 105 and multicast groups 109a-e comprise a pre-existing multicast local network.

A network appliance 201 is responsive to local server 105 and transmits data to multicast groups 109a-e, each of which is configured with a corresponding computer-based dongle 203a-e. Dongles 203a-e are configured to be responsive to the network appliance, and vice-versa, in a manner to be explained in greater detail below. Accordingly, the network appliance 201 and the dongles 203a-e form an intermediate local network 205 within the pre-existing multicast local network.

Referring again to FIG. 3A, as well as FIGS. 3C & 3D, the pre-existing local server 105 and multicast groups 109 are configured to transfer data in packets of three UDP data packets 301a-c. As a data transfer is initiated from source host (105, 109a-e), the intermediate network 205 is configured to intercept a UDP data packets 301, fragment it (FIG. 3C) into "split packets" 311a, b and encapsulate each split packet 311a, b with a transport control protocol (TCP) header 309a, b, forming a pair of TCP packets 313a, b. Further, the intermediate network 205 is configured to receive TCP packet pairs 313a, b, decapsulate them, reassemble the split packets 311a, b back into the original UDP data packet 301, and transfer the UDP data packet 301 on to the destination host 105, 109a-e.

To extend the example, if local server 105 transferred UDP data to multicast group K 109 packets 1, 2, and 3, 301a-c, the network appliance 201 would receive those packets, fragment them into split packets: 1A and 1B 311a, b; 2A and 2B, 311c, d; and 3A and 3B 311e, f. The network appliance 201 encapsulates each split packet with a TCP header addressed to the dongle 203 associated with multicast group K 109 (hereafter, "dongle K"). The network appliance then transfers the resulting pairs of TCP packets 313a, b, 313c, d, and 313e, f to dongle K 203. Dongle K 203 receives the TCP packets 313a, b, 313c, d, and 313e, f, decapsulates each pair and reassembles each decapsulated split packet 311 into the original data packet 301, and transfers the original three data packets 301a-c to the multicast group K 109 with which it is associated. Additionally, as dongle K 203 receives and processes the TCP packet 313a-f, it is configured to transfer TCP acknowledgement packages 317a-f back to network appliance 201 to insure delivery of the packet. If an acknowledgement packet is not received for a TCP packet, the network appliance will retransmit the packet 315 according to the well-known protocol.

Figure 3E:
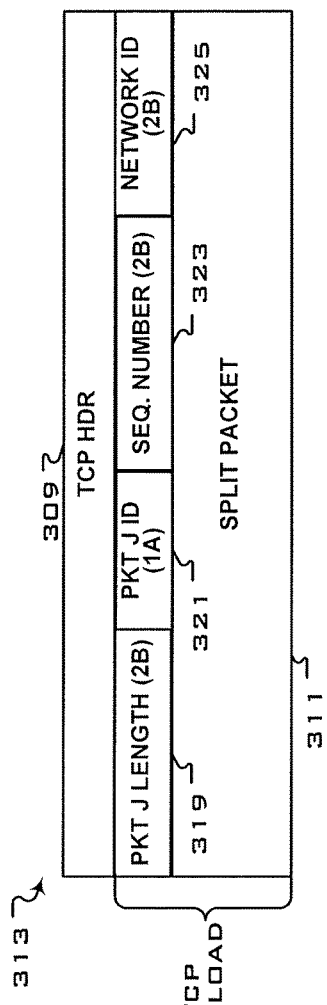
FIG. 3E depicts the frame structure of an encapsulated fragmented data packet.
Figure 3F:
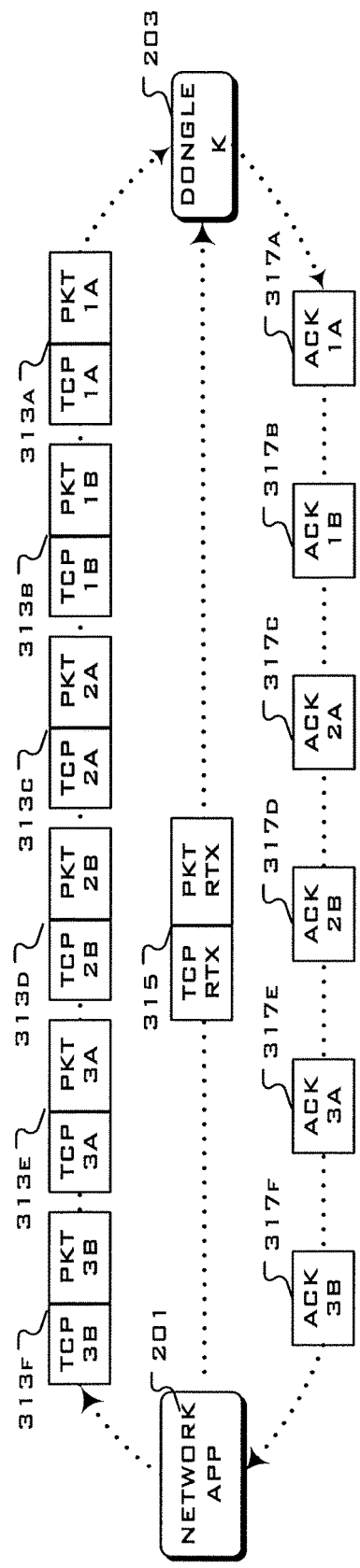
FIG. 3F shows the data transfer scheme of the intermediate unicast network.

FIG. 3E presents an exemplary segment structure of a TCP packet 313 with which a split packet 311 is encapsulated in the intermediate network 205. A typical TCP header 309 is associated with a split packet 311 which becomes the TCP payload 327 of the resulting TCP packet 313. In one embodiment, four fields are included in the TCP payload 327 represented by seven bytes of payload data. The first two bytes specify the length 319 of original packet 301. The original packet receives an ID value 321 in the next byte. The sequence number 323 of the split packet 311 is given two bytes and finally the network ID 325 of the multicast group 109 to which the data is addressed is represented in the last two bytes.

Figure 4:
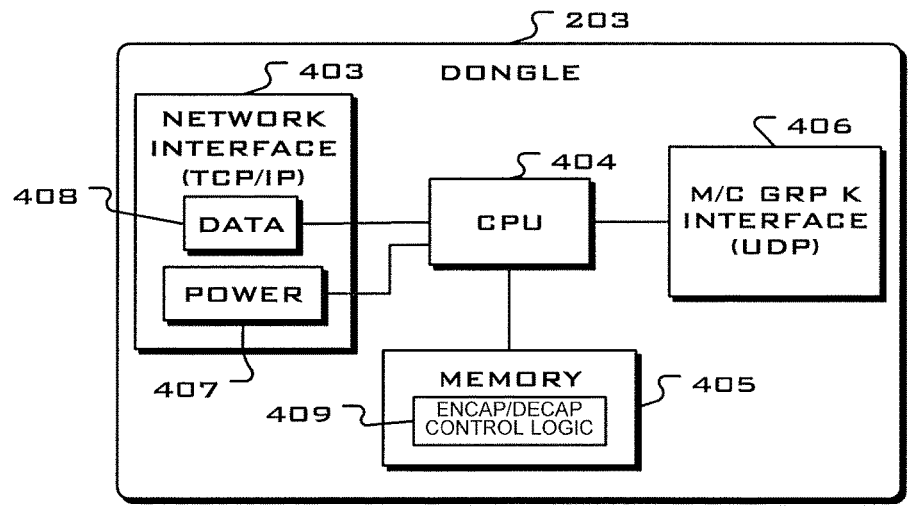
FIG. 4 is a functional schematic of an exemplary dongle device.

A functional diagram of an exemplary dongle 203 structure is presented in FIG. 4 wherein the dongle 203 includes a CPU 404 in communication with a network interface module 403 for communication with the intermediate network 205, an interface module 406 for communication with the associated multicast group 109 and a computer-readable memory 405 configured with control logic 409 which is called by the CPU 404 and causes the CPU 404 to execute the encapsulation and decapsulation processes described above. The dongle 203 may be advantageously configured to be powered through power-over-Ethernet (PoE). Thus, the network interface module 403 may incorporate a PoE splitter 407 such that power is diverted from the incoming data signal and conveyed to an appropriate power input to the CPU 404 as would be appreciated by those skilled in the relevant arts. Meanwhile incoming data 408 is conveyed to a CPU data port.

Figure 5:
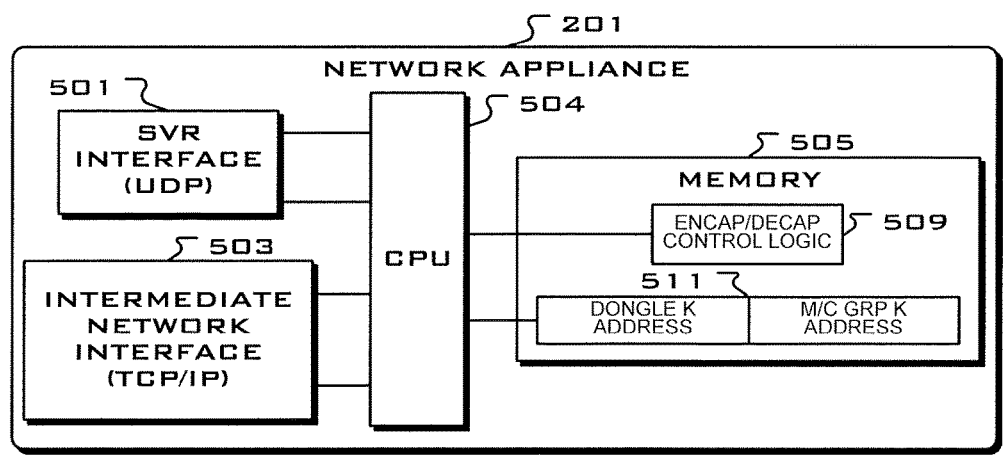
FIG. 5 is a functional schematic of an exemplary network appliance.

FIG. 5 presents a functional diagram of an exemplary network appliance 201 with a CPU 504 responsive to an interface module 501 adapted to be compatible with the local server 105, an intermediate network interface 503, and a computer-readable memory 505 configured with control logic 509 which is called by the CPU 404 and causes the CPU 404 to execute the encapsulation and decapsulation processes. Memory 505 is also configured with one or more data structures 511 in which are recorded the addresses of multicast group K 109 and its associated dongle K 203. The data structure(s) 511 are also called by CPU 404 per execution of control logic 509 in performing the processes described herein.

As will be appreciated by those skilled in the arts, the dongle 203 and the network appliance may be implemented with one or more computer-based processors. A processor in effect comprises a computer system that includes, for example, one or more central processing units (CPUs) that are connected to a communication bus. The computer system can also include a main memory, such as, without limitation, flash memory, read-only memory (ROM), or random access memory (RAM), and can also include a secondary memory. The secondary memory can include, for example, a hard disk drive or a removable storage drive. The removable storage drive reads from or writes to a removable storage unit in a well-known manner. The removable storage unit, represents a floppy disk, magnetic tape, optical disk, and the like, which is read by and written to by the removable storage drive. The removable storage unit includes a computer usable storage medium having stored therein computer software or data.

The secondary memory can include other similar means for allowing computer programs or other instructions to be loaded into the computer system. Such means can include, for example, a removable storage unit and an interface. Examples of such can include a program cartridge and cartridge interface, a removable memory chip (such as an EPROM, or PROM) and associated socket, and other removable storage units and interfaces which allow software and data to be transferred from the removable storage unit to the computer system.

The processor, and the processor memory, may advantageously contain control logic or other substrate configuration representing data and instructions, which cause the processor to operate in a specific and predefined manner as described herein. The control logic may advantageously be implemented as one or more modules. The modules may advantageously be configured to reside on the processor memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like. Control logic may be installed on the memory using a computer interface couple to the communication bus which may be any suitable input/output device. The computer interface may also be configured to allow a user to vary the control logic, either according to pre-configured variations or customizably.

The control logic conventionally includes the manipulation of data bits by the processor and the maintenance of these bits within data structures resident in one or more of the memory storage devices. Such data structures impose a physical organization upon the collection of data bits stored within processor memory and represent specific electrical or magnetic elements. These symbolic representations are the means used by those skilled in the art to effectively convey teachings and discoveries to others skilled in the art.

The control logic is generally considered to be a sequence of processor-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for processor operations and that these terms are merely conventional labels applied to physical quantities that exist within and during operation of the computer.

It should also be understood that control logic, modules, processes, methods, and the like, described herein are but an exemplary implementation and are not related, or limited, to any particular processor, apparatus, or processor language. Rather, various types of general purpose computing machines or devices may be used with programs constructed in accordance with the teachings described herein. Similarly, it may prove advantageous to construct a specialized apparatus to perform the method steps described herein by way of dedicated processor systems with hard-wired logic or programs stored in nonvolatile memory, such as, by way of example, read-only memory (ROM), for example, components such as ASICs, FPGAs, PCBs, microcontrollers, or multi-chip modules (MCMs). Implementation of the hardware state machine so as to perform the functions described herein will be apparent to persons skilled in the relevant art(s). In yet another embodiment, features of the invention can be implemented using a combination of both hardware and software.

With reference to FIG. 6A, a flowchart showing the steps of an exemplary process performed by the system 200 may begin with a data request 601 issued by multicast group K 109 using UDP format. The UDP datagram includes the network address 602 of multicast group K 109. Dongle K 203 receives the UDP data packet 301 from multicast group K 109 and encapsulates it 603 with a TCP header 309 resulting in a TCP data packet 313 that includes dongle K 203 network ID 604. Dongle K 203 then sends the TCP data packet 313 at step 605 to network appliance 201. At 606 the network appliance 201 decapsulates the TCP data packet 313 to retrieve the UDP packet 301, and concurrently records the multicast group K network ID 602 and the dongle K network ID and associates the respective IDs with one another in data structure 511 (Step 611). At Step 608 the network appliance 201 then forwards the UDP data packet 301 request from multicast group K 109 to the local server 105.

When the local server 105 responds, it transfers data destined for multicast group K 109 in sets of three UDP data packets 301a-c at a time as described above, the data packets 301 including the network ID 602 of multicast group K. The network appliance 201 receives the three UDP data packets 301a-c at Step 609 and fragments each packet 301 at Step 610, retrieving the destination network ID 602 of multicast group K. Then, at 611, the network appliance 201 looks up the dongle K network ID 604 from the data structure 509, and at 612 encapsulates each split packet (A, and B) with a TCP header 309 and adding the data described with reference to FIG. 3E. At Step 613, three pairs of TCP packets 313a-f are transferred to dongle K 203 which receives the packets and decapsulates them at Step 614, reassembles the packets into the three original UDP packets 301a-c at Step 615 and transfers the UDP packets 301a-c to multicast group K 109 at Step 616. A TCP acknowledgement packet 317a-f is sent from dongle K to the network appliance 201 upon receipt of each TCP packet 313a-f.

Figure 7:
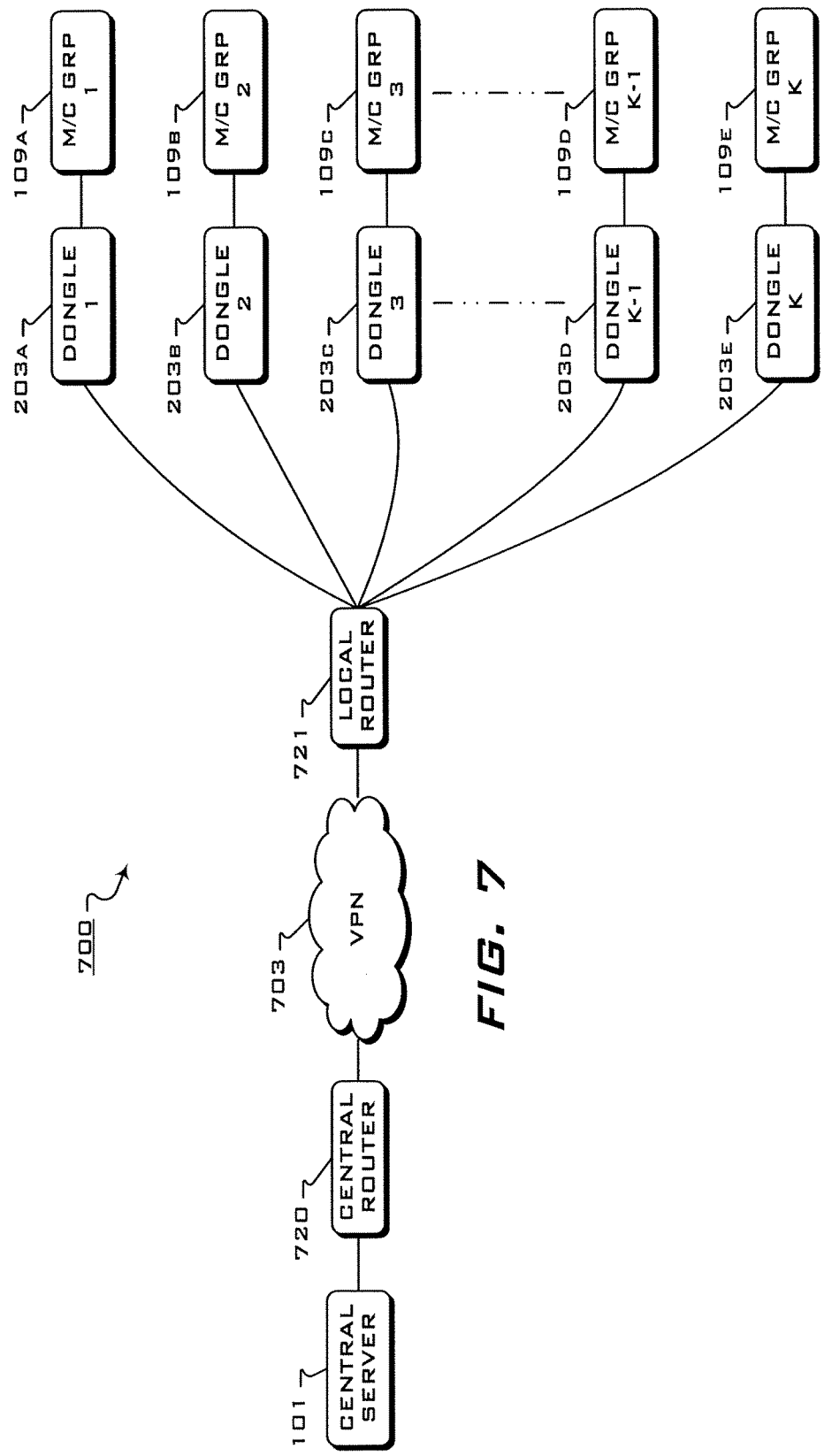
FIG. 7 is a functional diagram of an exemplary network architecture according to another embodiment of the intermediate network.

It will be appreciated by those skilled in the arts with the benefit of this disclosure that the solutions provided herein present an advantageously scalable system. For example, FIG. 7 depicts an exemplary network architecture 700 wherein central server 101 transfers data with a central router 720 that is in data communication with a plurality of distributed, remote local routers 721 through a computer-based, internetwork (i.e., the internet) which may be a VPN. Each local router 721 is configured to as an internet-compatible device that can receive data from the internet is in communication with a plurality of multicast groups 109a-e that are configured to transfer and receive data using only UDP data packets 301. Each multicast group 109a-e is associated with a dongle 203a-e configured substantially as described above performing the same operations. In this embodiment, data may be transferred from central server 101' in standard internet data transfer protocols (e.g., TCP/IP) addressed to specific dongles 203a-e which convert the data into UDP data packets 301 for transfer to the multicast groups 109a-e.

As described above and shown in the associated drawings, the present invention comprises an intermediate unicast network for such multicast data networks. While particular embodiments have been described, it will be understood, however, that any invention appertaining to the system and methods described is not limited thereto, since modifications may be made by those skilled in the art, particularly in light of the foregoing teachings. It is, therefore, contemplated by the appended claims to cover any such modifications that incorporate those features or those improvements that embody the spirit and scope of the invention.

What is claimed is:

1. An intermediate unicast network interposed within a local area network, said local area network being configured to transfer data according to a multicast protocol between a local server and a plurality of local multicast groups, said intermediate network comprising:
   a central server communicatively coupled to a virtual private network;
   a plurality of computer-based dongle devices, each of which is in communication with a corresponding multicast group from said plurality of multicast groups according to said multicast protocol; and
   a computer-based network appliance in communication with each of said plurality of dongle devices according to a unicast protocol, said network appliance also in communication with said local server according to said multicast protocol, said local server further in communication with the virtual private network;
   wherein said network appliance is configured with control logic that, when executed, causes said network appliance to perform the steps of:
   receiving data in said multicast protocol from said local server received from the central server over the virtual private network;
   translating said data in said multicast protocol to data in a unicast protocol; and
   transferring said data in said unicast protocol to one of said dongle devices.

2. The intermediate unicast network of claim 1, wherein each said dongle device is configured with control logic that, when executed, causes said dongle device to perform the steps of:
   receiving data in a multicast protocol;
   translating the data in multicast protocol to data in a unicast protocol transport structure; and
   transferring said data in said unicast protocol to a dongle device.

translating the data in multicast protocol to data in a unicast protocol transport structure; and
   transferring said data in unicast protocol transport structure to said network appliance.

3. The intermediate unicast network of claim 2, wherein said network appliance and each said dongle device are configured with control logic that, when executed, causes said network appliance and each said dongle device to perform the steps of:
   retrieving multicast data by removing a unicast protocol transport structure from data received according to a unicast protocol; and
   transferring said multicast data according to said multicast protocol.

4. The intermediate unicast network of claim 3, wherein data transferred according to said multicast protocol comprises one or more multicast data packets and wherein said network appliance is configured with control logic that, when executed, causes the network appliance to perform the steps of:
   fragmenting each said multicast data packet into a first split packet and a second split packet;
   applying a unicast protocol transport structure to each of said first and second split packets; and
   transferring said first and second split packets according to said unicast protocol.

5. The intermediate unicast network of claim 4, wherein each of said dongle devices is configured with control logic that, when executed, cause each said dongle device to perform the steps of:
   removing said unicast protocol transport structure from said first and second split packets received from said network appliance;
   reforming said multicast data packet by combining said first split packet with said second split packet; and
   transferring said multicast data packet according to said multicast protocol.

6. The intermediate unicast network of claim 1, wherein each said dongle device is identified by a unique dongle device identifier, and wherein each said multicast group is identified by a unique multicast group identifier.

7. The intermediate unicast network of claim 6, wherein said network appliance comprises a computer-readable memory configured with a data structure comprising a list of dongle device identifiers, and corresponding multicast group identifiers.

8. A quasi-unicast local network comprising:
   a local server configured to transfer multicast data to said network according to a multicast protocol;
   a plurality of network hosts configured to receive said multicast data from said local server according to said multicast protocol;
   a network appliance configured to receive said multicast data from said local server, convert said multicast data to unicast data, and transfer said unicast data according to a unicast protocol; and
   a plurality of dongle devices, each dongle device configured to receive said unicast data from said network appliance, convert said unicast data to said multicast data, and transfer said multicast data to a corresponding network host according to said multicast protocol;
   receiving data in said multicast protocol from said local server received from the central server over the virtual private network;
   translating said data in said multicast protocol to data in a unicast protocol transferring said data in said unicast protocol to one of said dongle devices, wherein said multicast data comprises one or more multicast data packets, said network appliance is further configured to fragment each said multicast data packet into first and second split packets and transfer said first and second split packet according to a unicast protocol, and each said dongle device is further configured to reassemble said first and second split packets into said multicast data packet and transfer said multicast data packet to a corresponding network host according to a multicast protocol.

9. A method of forming a quasi-unicast local network, said local network having a local server configured to transfer data to a plurality of network hosts according to a multicast protocol, said method comprising the steps of:

associating a network appliance with said server, said network appliance configured to receive multicast data from said server and transfer said multicast data according to a unicast protocol;

associating a dongle with each of said network hosts, each said dongle being configured to transfer data received from said network appliance to a corresponding network host according to said multicast protocol;

receiving data in said multicast protocol from said local server received from the central server over the virtual private network;

translating said data in said multicast protocol to data in a unicast protocol transferring said data in said unicast protocol to one of said dongle devices;

wherein said multicast data comprises one or more multicast data packets, and wherein said network appliance is further configured to split each said multicast data packet into a plurality of split packets, and wherein each said dongle is configured to reassemble said plurality of split packets into said multicast data packet.

* * * * *